(12) United States Patent
Rosburg et al.

(10) Patent No.: US 11,354,966 B2
(45) Date of Patent: Jun. 7, 2022

(54) HANDLES AND DISPLAYS FOR PRODUCT VENDING SYSTEM

(71) Applicant: PepsiCo, Inc., Purchase, NY (US)

(72) Inventors: Klaus Rosburg, Brooklyn, NY (US); Stephen Lim, Chappaqua, NY (US)

(73) Assignee: PepsiCo, Inc., Purchase, NY (US)

( * ) Notice: Subject to any disclaimer, the term of this patent is extended or adjusted under 35 U.S.C. 154(b) by 82 days.

(21) Appl. No.: 16/559,300

(22) Filed: Sep. 3, 2019

(65) Prior Publication Data

US 2021/0065492 A1 Mar. 4, 2021

(51) Int. Cl.
*G07F 9/02* (2006.01)
*G06Q 20/20* (2012.01)
*G07F 17/00* (2006.01)

(52) U.S. Cl.
CPC ............ *G07F 9/023* (2013.01); *G06Q 20/204* (2013.01); *G07F 17/0014* (2013.01)

(58) Field of Classification Search
CPC .... G06Q 20/20; G06Q 20/204; G06Q 20/203; G07F 9/023; G07F 17/0014; G07F 11/62
See application file for complete search history.

(56) References Cited

U.S. PATENT DOCUMENTS

| | | | | |
|---|---|---|---|---|
| 5,728,999 A * | 3/1998 | Teicher | ................... | G06Q 20/04 235/381 |
| 6,380,853 B1 * | 4/2002 | Long | .......................... | G07F 9/02 141/94 |
| 8,468,059 B2 * | 6/2013 | Enqvist | ................. | G07G 1/0054 705/23 |
| 2008/0017470 A1 | 1/2008 | Stockl et al. | | |
| 2010/0010903 A1 | 1/2010 | Jeong | | |
| 2011/0301749 A1 * | 12/2011 | Hammonds | ............. | H04L 67/10 700/232 |
| 2012/0169072 A1 | 7/2012 | Maguire | | |
| 2013/0299509 A1 | 11/2013 | Yasaka | | |
| 2013/0332271 A1 * | 12/2013 | Hay | ....................... | G06Q 20/20 705/14.51 |
| 2014/0103062 A1 | 4/2014 | Rose, Jr. et al. | | |
| 2017/0148005 A1 * | 5/2017 | Murn | ................... | G06Q 10/087 |
| 2017/0278060 A1 | 9/2017 | Daily et al. | | |

(Continued)

FOREIGN PATENT DOCUMENTS

CN 104992499 B 10/2018

OTHER PUBLICATIONS

International Search Report and Written Opinion of the International Searching Authority in International Application No. PCT/US2020/046995, dated Jan. 4, 2021 (11 pages).

*Primary Examiner* — Timothy R Waggoner
(74) *Attorney, Agent, or Firm* — Sterne, Kessler, Goldstein & Fox P.L.L.C.

(57) ABSTRACT

A handle for a product vending system includes a housing configured to be secured to a door of a product storage cabinet having a lock. The handle includes a display arranged on the housing, that is configured to show product information. A payment processing unit is arranged on the housing and is configured to detect or receive a payment. A control unit is configured to communicate with the lock of the product storage cabinet, such that when the payment is detected by the payment processing unit, the control unit is configured to unlock the lock of the product storage cabinet so as to provide access to a product stored in the product storage cabinet.

20 Claims, 8 Drawing Sheets

(56) References Cited

U.S. PATENT DOCUMENTS

2018/0130087 A1     5/2018  Lowe
2018/0365668 A1    12/2018  Hay
2019/0383550 A1*   12/2019  Miedema .............. F25D 23/028
2020/0273011 A1*    8/2020  Winsor .............. G06Q 30/0255

* cited by examiner

HANDLES AND DISPLAYS FOR PRODUCT VENDING SYSTEM

FIELD

Embodiments described herein generally relate to handles and displays for a product vending system. Specifically, embodiments described herein relate to a handle that includes a payment processing unit and a digital display that is configured to be secured to a product storage cabinet to form a product vending system.

BRIEF SUMMARY OF THE INVENTION

Some embodiments relate to handle for a product vending system that includes a housing configured to be secured to a door of a product storage cabinet having a lock, and a user interface arranged on the housing, wherein the user interface comprises a display configured to show product information. A payment processing unit is arranged on the housing of the handle, wherein the payment processing unit is configured to detect a payment source. The handle further includes a control unit configured to communicate with the lock of the product storage cabinet, such that when the payment source is detected by the payment processing unit, the control unit is configured to unlock the lock of the product storage cabinet so as to provide access to a product stored in the product storage cabinet.

Some embodiments relate to a product vending system that includes a cabinet having a storage compartment for storing products, and a door connected to the storage compartment, wherein the door is movable between a closed configuration and an open configuration. The product vending system further includes a handle securable to the door of the cabinet that includes a digital display, a payment processing unit configured to detect a payment source, and a control unit configured to control operation of the product vending system. The product vending system includes a product sensor arranged within the storage compartment that is configured to detect a product removed from the storage compartment, wherein the control unit is configured to cause the digital display to show product information about a product removed from the storage compartment as determined by the product sensor.

In any of the various embodiments discussed herein, the payment processing unit may include one or more of a credit card reader, a near field communication antenna, and a chip reader.

In any of the various embodiments discussed herein, the display may be a touch-screen display configured to receive a user input.

In any of the various embodiments discussed herein, the system may further include an audio unit configured to play an audible alert.

In any of the various embodiments discussed herein, the housing is configured to be retrofitted onto the door of the product storage cabinet.

In any of the various embodiments discussed herein, the cabinet may further include a lock configured to maintain the door in the closed configuration, wherein the control unit is in communication with the lock and is configured to unlock the lock when the payment source is detected by the payment processing unit.

In any of the various embodiments discussed herein, a product vending system may further include a product information display arranged within the storage compartment, wherein the product information display is configured to display the product information corresponding to a product removed from the storage compartment of the cabinet.

In any of the various embodiments discussed herein, a product vending system may further include a cabinet light arranged within the storage compartment, wherein the cabinet light is in communication with the control unit of the handle, and wherein the control unit is configured to increase a brightness of the cabinet light when the door of the cabinet is in the open configuration.

In any of the various embodiments discussed herein, the handle may further include an audio unit configured to play an audible alert when a product is removed from or is returned to the storage compartment of the cabinet as determined by the product sensor.

Some embodiments relate to a method for vending a product from a product storage cabinet, the method including the steps of receiving a payment at a control unit of a handle arranged on a door of the product storage cabinet; unlocking a lock of the door of the product storage cabinet upon receipt of the user input to allow the door of the product storage cabinet to be opened; detecting removal of the product from the storage compartment of the product storage cabinet by a product sensor; and displaying product information about the product removed from the product storage cabinet on a display of the handle.

In any of the various embodiments discussed herein, receiving a user input may include detecting a payment source by a payment processing unit of the handle.

In any of the various embodiments discussed herein, a method for vending a product may further include dimming the display of the handle after unlocking the lock of the door of the product storage cabinet.

In any of the various embodiments discussed herein, a method for vending a product may further include playing an audible alert by an audio unit when a product is removed from the storage compartment of the product storage cabinet as determined by the product sensor.

In any of the various embodiments discussed herein, a method for vending a product may further include increasing a brightness of a cabinet light arranged within the storage compartment after unlocking the lock of the door of the product storage cabinet.

In any of the various embodiments discussed herein, displaying product information may include displaying a total price of products removed from the storage compartment.

In any of the various embodiments discussed herein, a method for vending a product may further include receiving a user input at a user interface of the handle to complete a purchase of the product removed from the storage compartment.

In any of the various embodiments discussed herein, a method for vending a product may further include displaying the product information on a product information display arranged within the storage compartment of the product storage cabinet.

In any of the various embodiments discussed herein, a method for vending a product may further include locking the door of the product storage cabinet after a predetermined period of time.

In any of the various embodiments discussed herein, a method for vending a product may further include detecting a return of the product to the storage compartment of the product storage cabinet after the product is removed from the storage compartment.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION OF THE INVENTION

Figure 1:
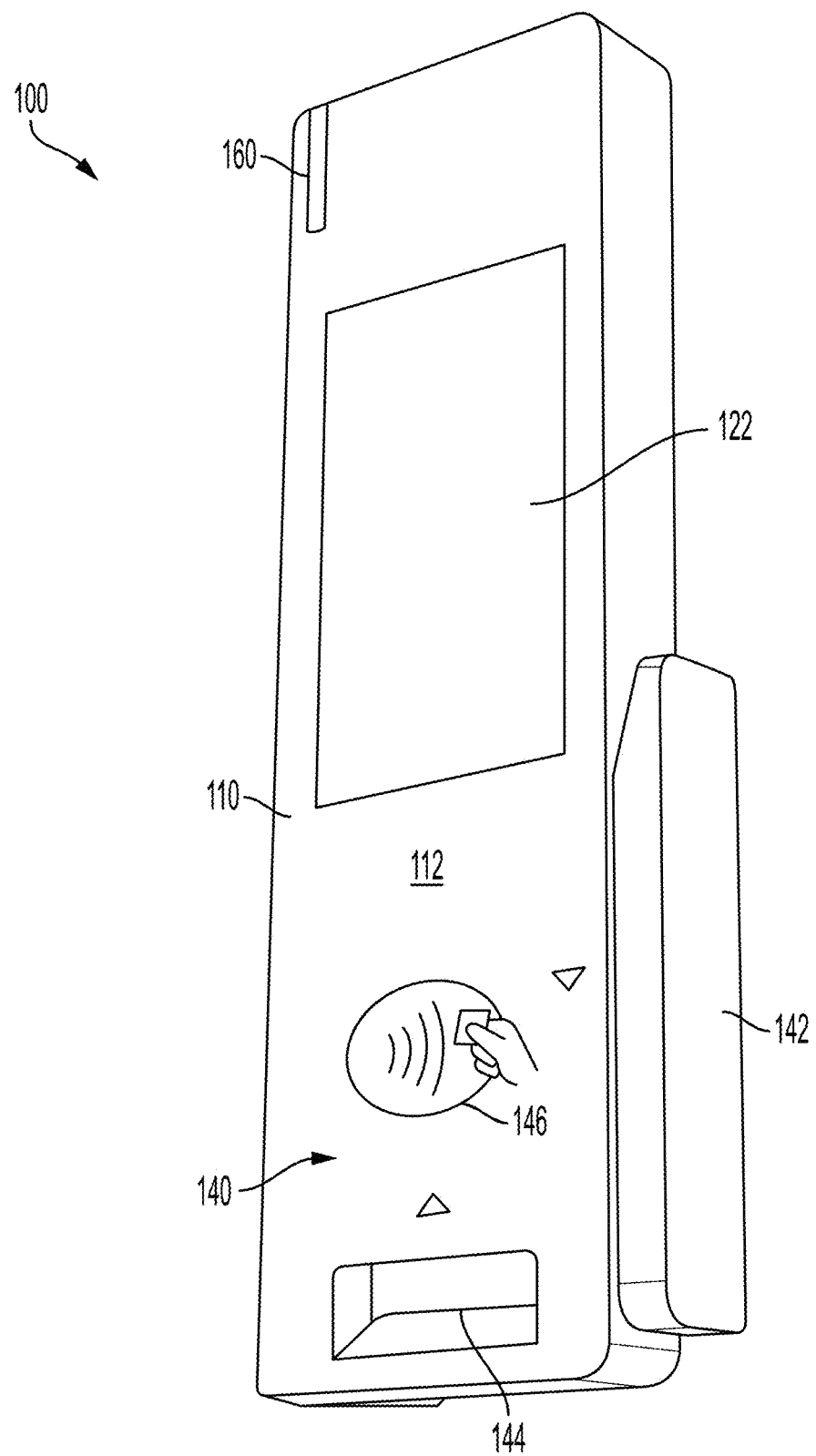
FIG. 1 shows a perspective view of a handle for a product vending system according to an embodiment.

Reference will now be made in detail to representative embodiments illustrated in the accompanying drawing. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Vending machines are commonly used to dispense products to consumers in an on-demand fashion at various locations, such as grocery stores, convenience stores, shopping malls, sporting or concert venues, gas stations, offices, and movie theaters, among others. Vending machines may be used to dispense any of various types of products, such as food and beverages, or other merchandise, such as toys or electronics. While vending machines may provide consumers with a convenient method for purchasing a product, existing vending machines have a number of drawbacks.

Vending machines generally do not allow a consumer to physically select the specific product to be purchased. Instead, the consumer simply preselects the type of product to be purchased via an interface, and the vending machine dispenses a product of the selected type. As a result, the consumer is unable to physically handle and inspect a product prior to purchasing the product. This may be undesirable when the consumer is not familiar with the product and would benefit from the ability to inspect the product, its packaging, nutritional information, and ingredients. Further, a consumer may prefer to personally select the product to be purchased to ensure that the product is not damaged and to ensure that the desired product is purchased.

Existing vending machines often require the consumer to enter a code corresponding to the desired product. Taking the time to determine a product code and enter the product code adds a step to the process of purchasing a product and introduces the potential for user error. A consumer may accidentally enter the wrong product code, causing the incorrect product to be dispensed. Similarly, since the consumer cannot physically select and remove the product from the vending machine, there is a risk that the vending machine fails to dispense the selected product, or the dispensed product may be damaged, expired, or otherwise defective. Once dispensed, the consumer is unable to return an incorrect product or a defective product.

Further, vending machines are generally configured to dispense a single product at a time. If a consumer wishes to purchase multiple products, the consumer has to repeat the steps of entering payment, identifying a product code, and entering a product code to dispense the product. This can be time-consuming and inconvenient, and a consumer may prefer to purchase multiple products in a single transaction.

Some embodiments described herein relate to a product vending system having a product storage cabinet and a handle that includes a digital display, a control unit, and a payment processing unit, wherein upon receipt of a payment or pre-authorization at the payment processing unit, the control unit unlocks a door of the cabinet in order to allow a consumer to physically select one or more products for purchase. In this way, the consumer can handle and inspect a product for purchase, guaranteeing that the correct product is selected and dispensed to the consumer. Further, as the consumer has access to the storage compartment, the consumer can easily select and purchase multiple products in a single transaction. Some embodiments described herein relate to a handle having a digital display, a control unit, and a payment processing unit that can be retrofitted onto an existing cabinet in order to convert the cabinet into a product vending system. As a result, a product vending system can be formed by integrating the handle with a cabinet, and an operator of the product vending system can sell products from an existing cabinet or cooler without having to purchase a traditional vending machine.

Some embodiments described herein relate to a handle 100 for a product vending system 200. Handle 100 includes a digital display 122 for displaying instructions and/or product information to the consumer. Handle 100 further includes a payment processing unit 140 configured to receive a payment source from a consumer for purchasing products. Handle 100 may be integrally formed with, or may be retrofitted onto a cabinet 220 for storing products 400 available for purchase. In operation, a door 224 of cabinet 220 is configured to be unlocked when an authorized user is detected, which may be for example when a payment is received or detected by payment processing unit 140. Upon detection of an authorized consumer, the consumer can select a product within cabinet 220 for purchase. Products removed from cabinet 220 are automatically identified by product sensors 270 of cabinet 220 and display 122 of handle 100 may show product information corresponding to the removed products. When the consumer is finished selecting products, the consumer may close door 224 of cabinet 220 and complete the purchase at digital display 122 of handle 100.

In some embodiments, a handle 100 for use with a product vending system 200 includes a housing 110, a display 122 arranged on housing 110, a control unit 150 for controlling operation of the product vending system 200, and a payment processing unit 140 arranged on housing 110 and configured to detect a payment source, as shown for example in FIG. 1. In some embodiments, housing 110 may enclose control unit 150 and other components of handle 100. In some embodiments, control unit 150 may be electrically connected to housing 110 of handle 100 and components thereof and may be located external to housing 110. For example, control unit 150 may be located on or within a portion of cabinet 220 or a door 224 of cabinet 220. Housing 110 of handle 100 may have a generally rectangular shape. However, housing 110 of handle 100 can be formed so as to have any of various shapes, including but not limited to a square, a circle, a semi-circle, a wedge-shape, a U-shape, an L-shape. When handle 100 is secured to a door 224 of a cabinet 220, handle 100 is configured to extend from a surface of door 224 so that handle 100 may be grasped by a consumer to open door 224 of cabinet 220.

In some embodiments, display 122 may be arranged on a front surface 112 of housing 110 of handle 100. Display 122 may show instructions for operating a product vending system and may further show product information to a consumer during a product vending operation. Display 122 may include a liquid crystal display (LCD), a light emitting diode (LED) display, or an organic-LED (OLED) display, among other types of displays known in the art. In some embodiments, display 122 may be part of a user interface 120 for receiving user input. Display 122 may be a touch-screen display such that a consumer may touch a portion of display 122 to enter a user input.

Figure 2:
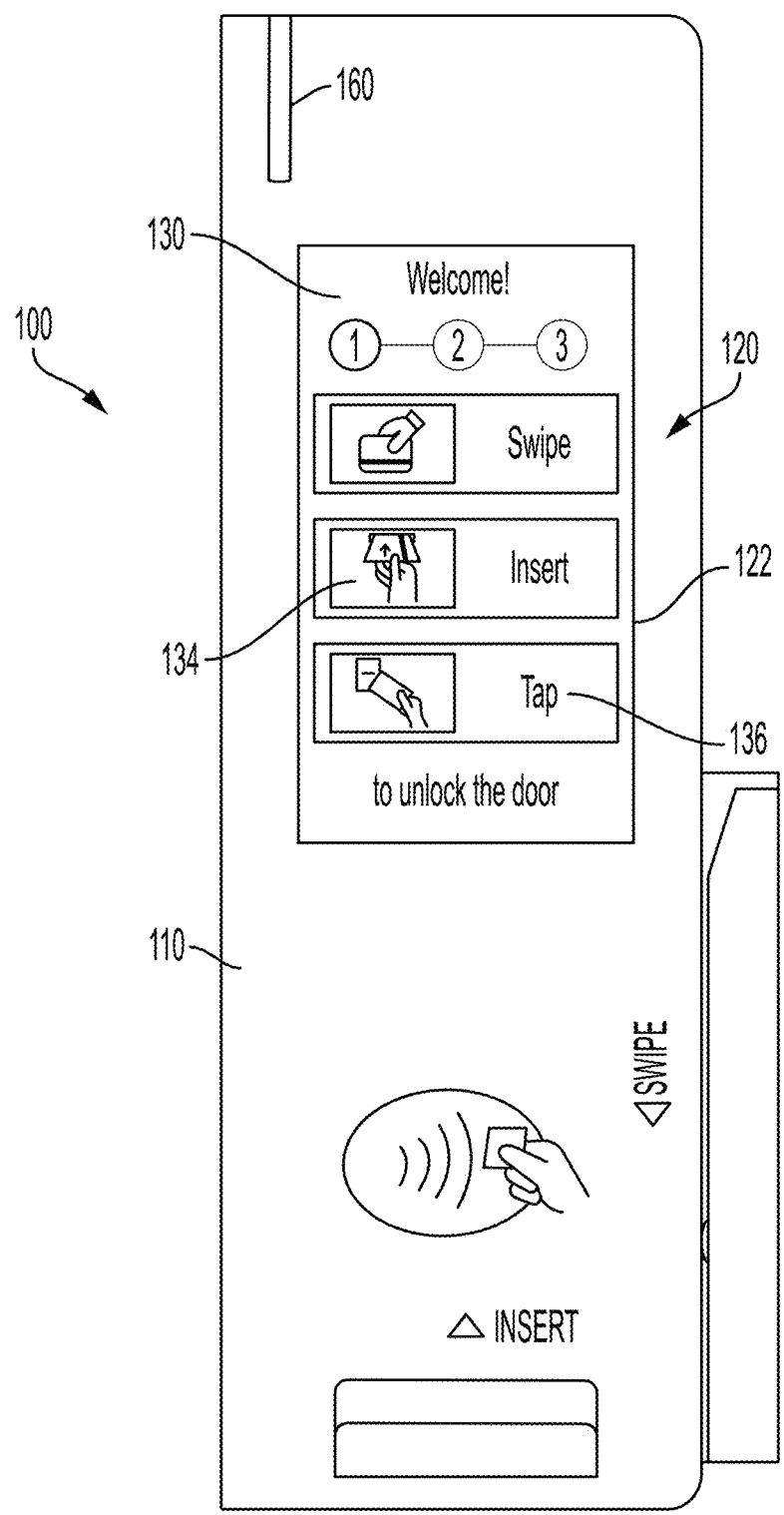
FIG. 2 shows a view of a graphical user interface of the handle of FIG. 1.

Display 122 may be configured to display a graphical user interface (GUI) 130 for a product vending system, as shown for example in FIG. 2. GUI 130 may provide instructions for operating a product vending system on which handle 100 is installed. GUI 130 can display text, images, or videos that provide information relating to the product vending system. For example, instructions may include text 136 explaining the steps for purchasing a product, such as providing a payment source, selecting a product, and completing purchase. Each step may also include a corresponding image 134 or animation showing a consumer providing a payment source, a consumer selecting a product, and a consumer completing the purchase. Further, GUI 130 may show one or more icons for receiving user input, such as an input to confirm a product selection or to complete a purchase of a product. In embodiments having touch screen display, user may touch a portion of display 122 at which an icon is shown in order to enter the user input. In some embodiments, user interface 120 may further include one or more actuators, such as push-buttons, levers, dials, switches, or the like for receiving a user input. In embodiments having actuators, user may utilize actuators navigate options shown on display 122 or to enter a user input.

In some embodiments, handle 100 is configured to detect the presence of an authorized user. The presence of an authorized user may be determined, for example, upon receipt of a payment by handle 100. Handle 100 may include a payment processing unit 140 configured to detect a payment source and receive payment from a user, as shown in FIG. 1. Payment processing unit 140 is arranged on housing 110 of handle 100 and may be configured to detect and receive one or more types of payments. Payment processing unit 140 may include a magnetic stripe reader 142 for reading a credit card, debit card, gift card, ATM card, and the like, a chip reader 144 (e.g., a Europay, Mastercard, and Visa (EMV) chip reader) for reading credit cards, debits cards, and other payment cards having electronic chips, i.e., chip cards, and a near field communication (NFC) reader 146 for contactless payments. Payment processing unit 140 may also be configured to receive a mobile payment, such as a payment made using Apple Pay or Google Pay, and may include an RFID sensor configured to read or detect an RFID tag, or a QR code reader configured to scan a QR code or a barcode displayed on a printed membership card, a shopping bag, a bottle, among other items, or a QR code displayed on a mobile device, such as on a software application (or "app") on the mobile device. Further, payment processing unit 140 may be configured to receive a remote payment or an indication that a consumer has made a payment, such as a payment made on a smartphone or an application on a smartphone, and the indication of remote payment is transmitted to handle 100 to allow a consumer to purchase a product without entering payment at handle 100 of beverage dispensing system.

In some embodiments, an authorized user may be determined by entering an identification of a user, such as by entering a user's name wherein the user's name is stored in a database, scanning an identification such as a driver's license or passport, or by entering an identification code. Further, handle 100 may include a biometric sensor 170 (see FIG. 3) configured to determine an identity of a consumer, and, thus, the presence of an authorized user. A consumer's identity may be tied to a payment source, such that upon identification of the consumer, the consumer's payment source can be automatically accessed for purchasing a product. Biometric sensor 170 may be configured to identify an individual based on a fingerprint, a palm-print, a retina, an iris, a face or facial feature, among other biometrics.

In some embodiments, handle 100 includes an indicator light 160 as shown in FIG. 1. Indicator light 160 may be, for example, one or more light emitting diodes (LEDs). Indicator light 160 is configured to indicate a status of a product vending operation. Indicator light 160 may be configured to illuminate in a manner that indicates one or more different steps of a product vending operation. In embodiments, indicator light 160 may illuminate in different colors and may blink or flash to provide additional visual feedback to a consumer during a product vending operation. For example, indicator light 160 may illuminate in a first color, such as green, when product vending system 200 is available for use, indicator light 160 may illuminate in a second color, such as blue, when product vending system 200 is in use, and indicator light 160 may illuminate in a third color, such as red, to indicate an error, such as a declined payment, an unauthorized item detected within storage compartment 235, or to provide a warning to indicate that a purchase is about to be completed or that a door 224 of cabinet 220 is about to lock.

In some embodiments, an audio unit 190 may be configured to emit or produce an audible alert or tone. Audio unit 190 may be arranged on or within housing 110 of handle 100, or may be located external to handle 100 such as on a portion of cabinet 220 or on a door 224 of cabinet 220. In such embodiments, audio unit 190 may be in wired or wireless communication with handle 100. Audio unit 190 may include a memory to store one or more pre-recorded sounds, tones, or messages, among other audible alerts. Audio unit 190 may be configured to play a greeting or welcome to a consumer upon detection of a consumer or upon receipt of a payment source. Further, audio unit 190 may play a message to thank the consumer upon completion of a purchase. Audio unit 190 may also be configured to produce an alert when a product is removed from or is returned to a product storage compartment of a product vending system, as discussed in further detail below.

Figure 4:
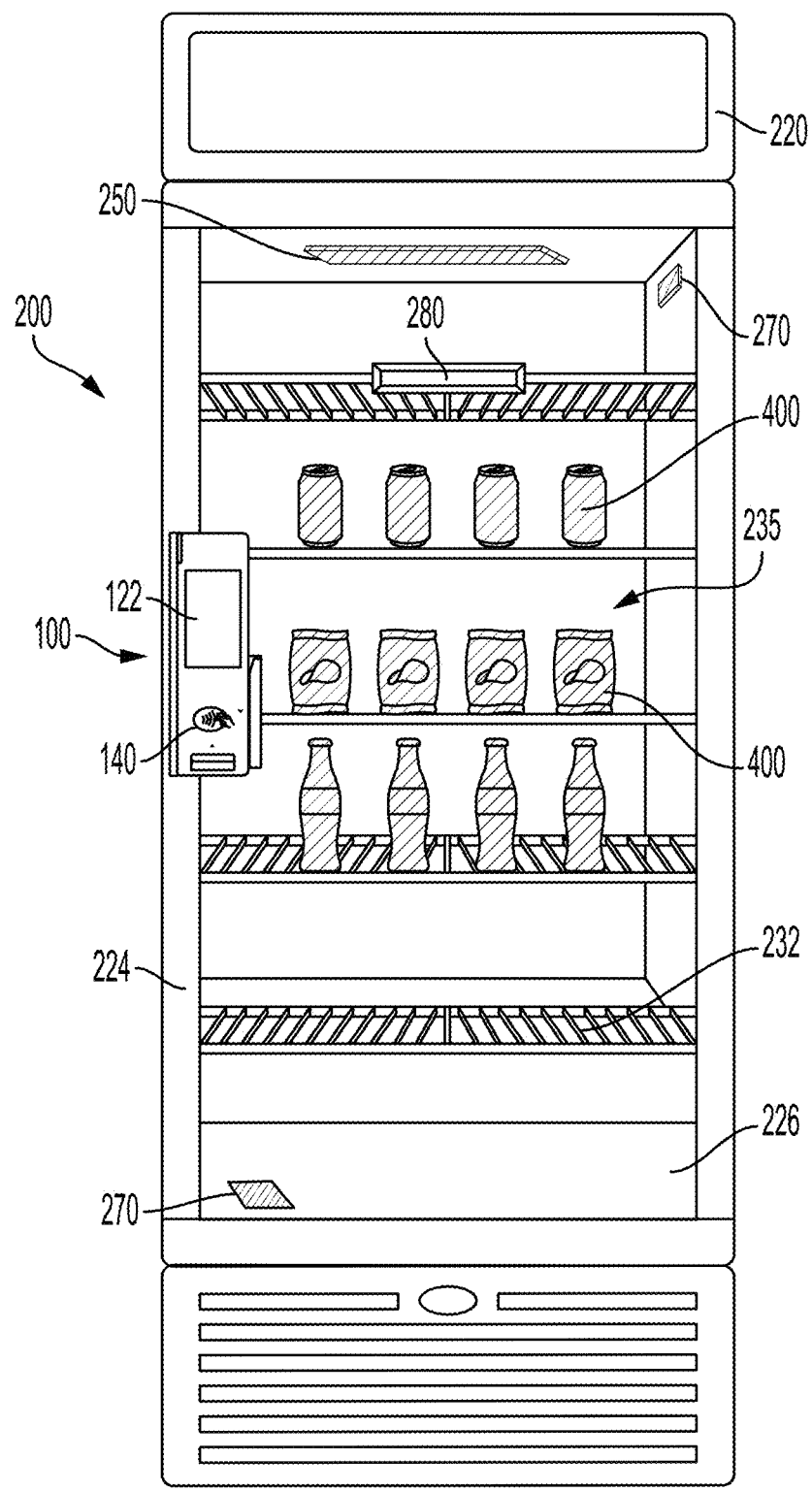
FIG. 4 shows a perspective view of the handle of FIG. 1 as installed on a cabinet.

A product vending system 200 includes a handle 100 as described herein, and a product storage cabinet 220, as shown for example in FIG. 4. Cabinet 220 defines a product storage compartment 235 for storing products 400, and includes a door 224 movably connected to storage compartment 235 such that door 224 can move between a closed configuration in which products within storage compartment 235 are enclosed within cabinet 220 and are inaccessible to a consumer, and an open configuration in which door 224 slides or pivots away from storage compartment 235 so that products 400 therein can be accessed by a consumer. Cabinet 220 may have any of various geometries and may be shaped as a rectangular prism, a cube, a cylinder, or cabinet 220 may have a transverse cross sectional area that is semi-circular, triangular, or elliptical, among other cross sectional shapes. Cabinet 220 may store any of various types of products, such as beverages, including canned or bottled beverages, or food products, such as bags of chips or pretzels, energy bars, candy, cookies, granola bars, snack mixes, and protein bars, among various other food or beverage products. Cabinet 220 may also store products such as reusable containers or bottles, e.g., a water bottle or sports bottle, for purchase by consumers. In some embodiments, door 224 of cabinet 220 can include a transparent portion 226 so that a consumer may view products 400 within storage compartment 235 without having to open door 224. Door 224 may be pivotally connected to cabinet 220 by a hinge, or door 224 may slide on a track of cabinet 220.

In some embodiments, storage compartment 235 may be a temperature-regulated compartment, such as a refrigerated compartment, for storing perishable food or beverage products, such as dairy-based products, produce, or for maintaining food or beverages at a cool temperature. In such embodiments, cabinet 220 may be a refrigerated cooler that includes a cooling unit, such as a vapor-compression or a thermoelectric refrigeration system, for maintaining storage compartment 235 at a predetermined temperature for storing food and beverage products. In some embodiments, cabinet 220 may not have a dedicated cooling unit, but may be insulated and/or provide passive cooling. Cabinet 220 need not be a refrigerated compartment and can be maintained at ambient temperature when used to store products such as chips, pretzels, candy, cookies, granola bars, protein bars, energy bars, among other products that are not required to be refrigerated.

In some embodiments, cabinet 220 includes a lock 240 (see FIG. 3) for maintaining door 224 in the closed configuration to prevent unauthorized users from accessing storage compartment 235 and products 400 therein. Lock 240 may be an integral part of an existing cabinet 220, or a lock 240 may be obtained separately and installed on door 224 of cabinet 220 in order to form a product vending system 200. Lock 240 may be, for example, an electromagnetic lock or an electro-mechanical lock, among other types of locks. Lock 240 may be in communication with control unit 150 of handle 100 so that handle 100 can control operation of lock 240.

Cabinet 220 may also include a cabinet light 250 (see FIG. 4) within storage compartment 235 that illuminates storage compartment 235 to allow products 400 therein to be more easily viewed. Cabinet light 250 may be for example, one or more LEDs, an incandescent bulb, a fluorescent light, or an arc lamp. Cabinet light 250 may be an integral part of cabinet 220, or a cabinet light 250 may be obtained separately and installed in cabinet 220 to form product vending system 200.

In some embodiments, product vending system 200 includes one or more product sensors 270 configured to detect when a product 400 has been removed from, or returned to storage compartment 235 of cabinet 220. In some embodiments, product sensor 270 can be an optical sensor, such as a camera, configured to detect and identify a product removed from cabinet 220. For example, optical sensor may capture a video of products as they pass by sensor while being removed from or inserted into storage compartment 235 and may compare the products in the captured video with an image library, such as an edge or cloud-based image library. Alternatively, optical sensors may capture images of products within storage compartment before and after a consumer's purchase to determine which products have been removed. However, various types of sensors 270 may be used to detect removal and return of a product 400 from cabinet 220 as will be readily understood by one of ordinary skill in the art. For example, other types of sensors 270 that can be used instead of or in addition to optical sensors include weight sensors to determine a weight of products in storage compartment before and after products are removed, or radio frequency identification (RFID) tags and RFID readers/scanners to detect removal and return of products. In some embodiments, product sensor 270 may identify a product by detecting a shape and/or color of a product removed from cabinet 220. Product sensor 270 may be positioned at a front portion of storage compartment 235 adjacent door 224, such as at a corner of storage compartment 235 or on a shelf 232 of storage compartment 235. Product sensors 270 may define a plane parallel to a front surface of cabinet 220 so as to detect when a product 400 passes through the plane, indicating that a product 400 is being removed from or returned to cabinet 220.

In some embodiments, handle 100 may be retrofitted onto an existing cabinet 220 such that a cabinet 220 for storing products can be converted into a product vending system 200 upon installation of handle 100. In this way, any of various types and styles of cabinets 220 can be converted into a product vending system for vending products to consumers by installing handle 100. Handle 100 may be secured to a door 224 of a cabinet 220 having a storage compartment 235 via mechanical fasteners, such as bolts or screws, or may be secured using adhesives or epoxies among other fastening methods. Further, one or more of a lock 240, a cabinet light 250, and product sensors 270, can be installed on cabinet 220 to form product vending system 200, or cabinet 220 may already include one or more of a lock 240, a cabinet light 250, and product sensors 270. Handle 100 may be placed in communication with lock 240, cabinet light 250, and product sensors 270 via wired or wireless communication so as to control operation of product dispensing system 200.

In some embodiments, however, handle 100 may be integrally formed with or built-into a cabinet 220. Handle 100 can be integrally formed with door 224 of cabinet 220, and may be arranged on a side of door 224 opposite a side of door 224 having a hinge, as shown in FIG. 4.

Figure 3:
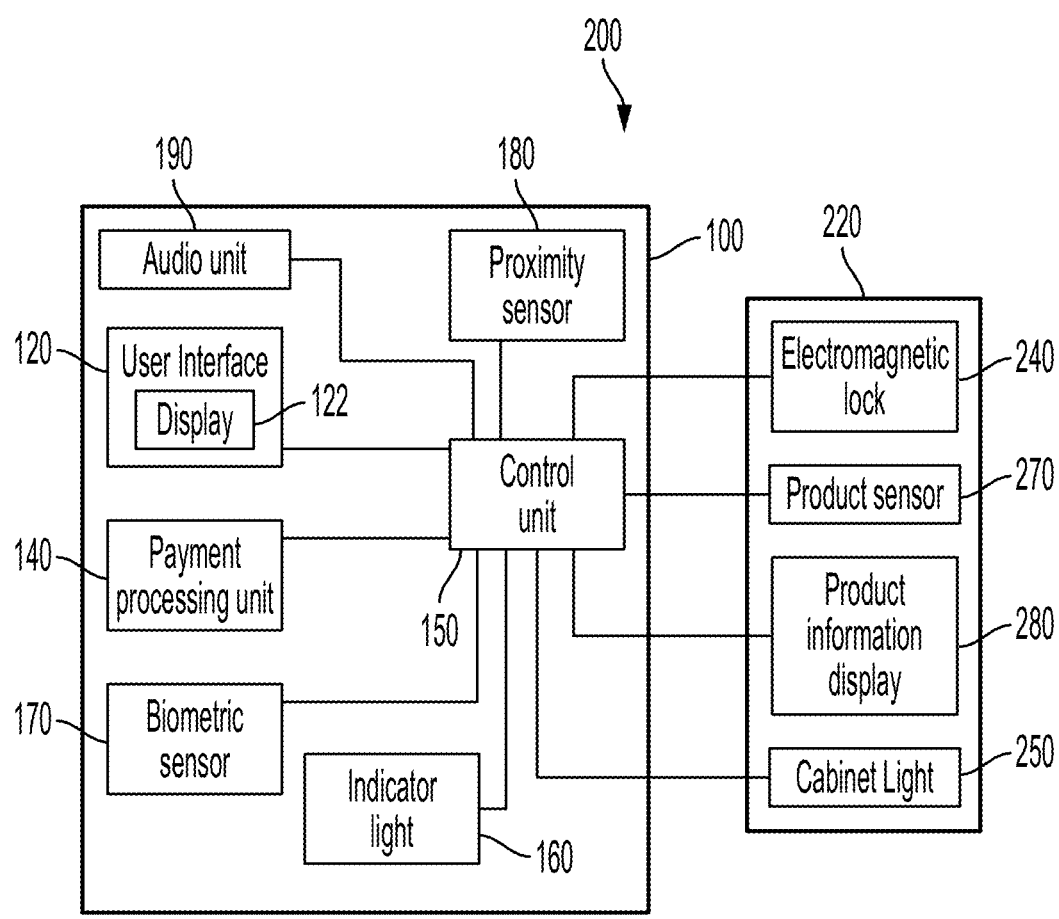
FIG. 3 shows a schematic diagram of the components of a handle for a product vending system according to an embodiment.

Control unit 150 of handle 100 coordinates operation of product vending system 200, as shown in FIG. 3. In some embodiments, a single control unit 150 may control operation of all components of product vending system 200. In some embodiments, two or more control units 150 may be used, wherein the multiple control units 150 are used to control different operations or components of product vending system 200. For example, a first control unit may control a payment processing unit and a digital display, while a second control unit may control operation of a door lock, a cabinet light, and/or product sensors. While it is understood that multiple control units 150 may be used, for convenience, the description herein refers primarily to embodiments having a single control unit 150.

Control unit 150 of handle 100 may be placed in communication with lock 240 of cabinet 220, such as by wired or wireless communication. For example, handle 100 and lock 240 may be connected by a wire extending through a frame of door 224 of cabinet 220 to provide a seamless appearance. Control unit 150 may be configured to disengage lock 240 of cabinet 220 when an authorized user is detected, such as when a payment or payment source is received or detected, so that the user may open door 224 of cabinet 220 and select from the products 400 within storage compartment 235 of cabinet 220.

Control unit 150 may be in communication with cabinet light 250 so as to control illumination of cabinet light 250. Control unit 150 may cause cabinet light 250 to increase in brightness or intensity when a door of cabinet 220 is opened. Increasing a brightness of cabinet light 250 may help to allow consumers to determine that a product purchasing operation is underway, to allow consumers to more easily view products 400 stored within storage compartment 235, and to facilitate operation of product sensors 270 in identifying products. Control unit 150 may cause cabinet light 250 to turn-off or dim when product vending system 200 is not in use so as to conserve energy.

Figure 5:
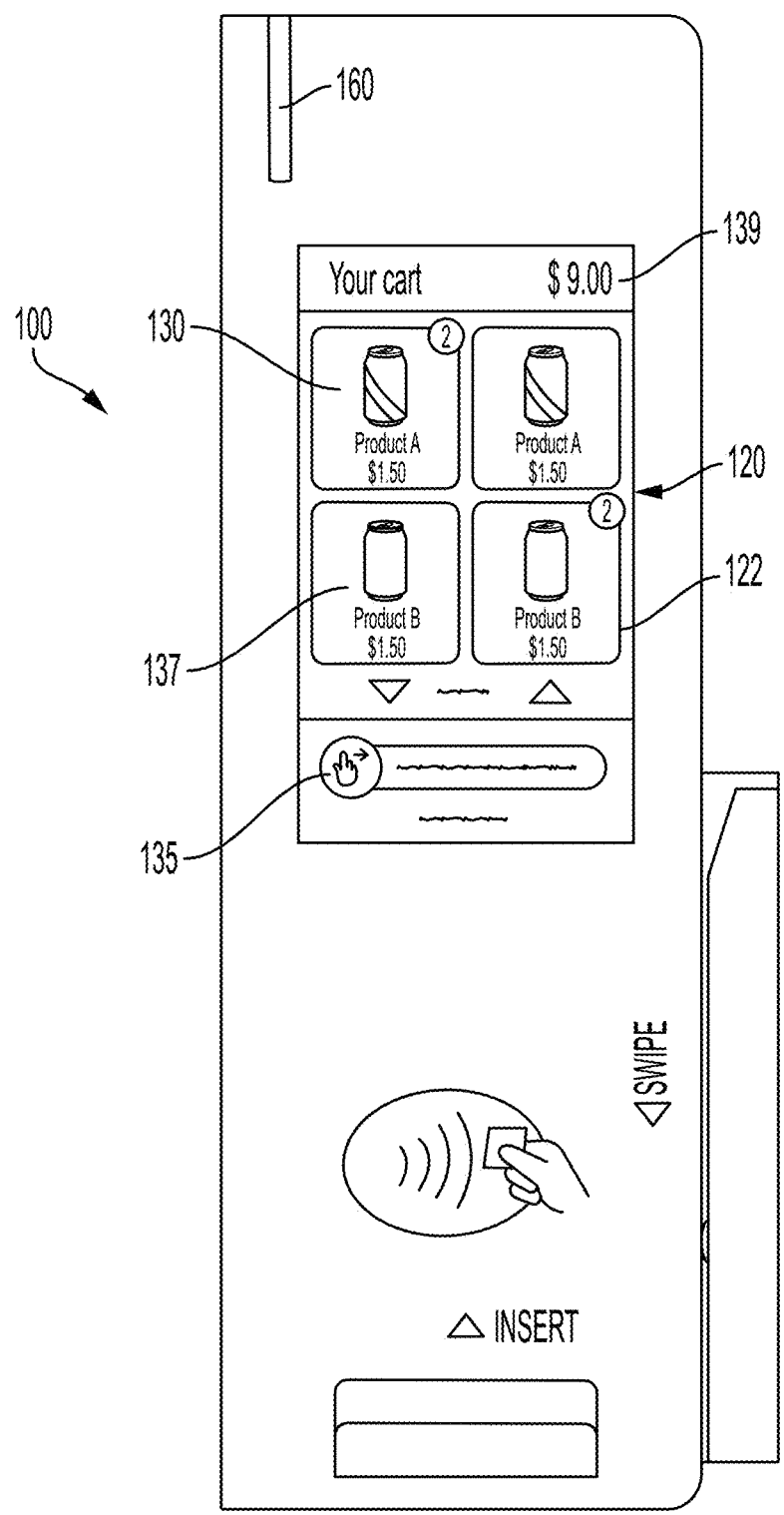
FIG. 5 shows a view of a graphical user interface of the handle of FIG. 1.

Control unit 150 may be in communication with product sensors 270 so as to receive information about products removed from and returned to storage compartment 235. Control unit 150 may store information about products within storage compartment 235 of cabinet 220. Control unit 150 may cause product information about a product removed from cabinet 220 as determined by product sensors 270 to be displayed on display 122 of handle 100, as shown in FIG. 5. The displayed product information may include the type or name of the removed product and the price of the removed product. As a consumer removes products 400 from storage compartment 235, display 122 of handle 100 may show product information 137 for each product removed and may show a virtual shopping cart. Display 122 may show an image of the product removed, a price of the product removed, a name, type, or brand of the product removed, and the total price 139 of all products removed. Display 122 may update in real-time as consumer removes and returns products to storage compartment 235. When display 122 of handle 100 is a touch-screen display, display 122 may be configured to show an icon 135 for completing purchase of any items in the virtual shopping cart. The consumer may touch the display at the location of icon 135 to complete the purchase. In some embodiments, icon 135 may require a consumer to perform a gesture, such as a swiping on display 122 from left to right along a path or track, in order to complete the purchase. Requiring a gesture may help to prevent the user from accidentally completing a purchase by unintentionally pressing display 122 at location of icon 135.

In some embodiments, a product vending system 200 may further include a product information display 280, as best shown in FIG. 4. Product information display 280 is configured to display information about a product 400 removed from cabinet 220, such as a brand of the product (e.g., Pepsi), the type of product removed, the weight of the product (e.g., in ounces or grams), the volume of the product (e.g., in milliliters), the price of the product, and a total price of all products removed. Product information display 280 can be arranged within storage compartment 235 of cabinet 220 so that display 280 is easily viewed while the consumer selects products 400 from cabinet 220 for purchase. For example, product information displays 280 may be arranged on one or more shelves 232 within cabinet 220. Product information display 280 may be an alphanumeric display that simply displays alphanumeric characters. However, product information display 280 may be a LCD, LED, OLED display, or electronic ink (e-ink) display, among other types of displays. Product information display 280 allows a consumer to easily determine a price of a product (or other information about the product) by removing the product from storage compartment 235 of cabinet 220 and viewing the price and other product information on product information display 280.

Product information display 280 may display product information that is also displayed on digital display 122 of handle 100. Thus, product information display 280 and digital display 122 of handle 100 may simultaneously display product information. In some embodiments, digital display 122 of handle 100 displays product information when door 224 of cabinet 220 is closed, and when door 224 is open, digital display 122 of handle 100 dims or turns off and product information is instead displayed on product information display 280. For example, when door 224 is rotated 90 degrees or 180 degrees into an open configuration such that the face of handle 100 and display 122 are rotated away from the user, digital display 122 may dim or turn off. This may prevent personal information of the user (e.g., account information, product purchase information, etc.) from being openly shown, and, thus, may provide additional privacy to the user. When door 224 is closed, product information display 280 dims or turns off and product information is displayed on digital display 122 of handle 100.

In some embodiments, control unit 150 may store and track the inventory of products within storage compartment 235. The product inventory may update automatically as products are removed and returned to storage compartment 235 as detected by product sensor 270. Since the product inventory is known, control unit 150 may determine when an unknown item has been inserted into cabinet 220. For example, a consumer may accidentally leave an item in cabinet 220 while selecting products, or a consumer may attempt to avoid payment for a removed product by inserting an unknown item into storage compartment 235 to provide the appearance that the removed product has been returned. If an unknown item is inserted into cabinet 220 as determined by product sensor 270, or a number of items returned to cabinet 220 exceeds a number of products removed from cabinet 220, control unit 150 may prevent completion of a purchase until any unknown items are removed from cabinet 220.

Figure 6:
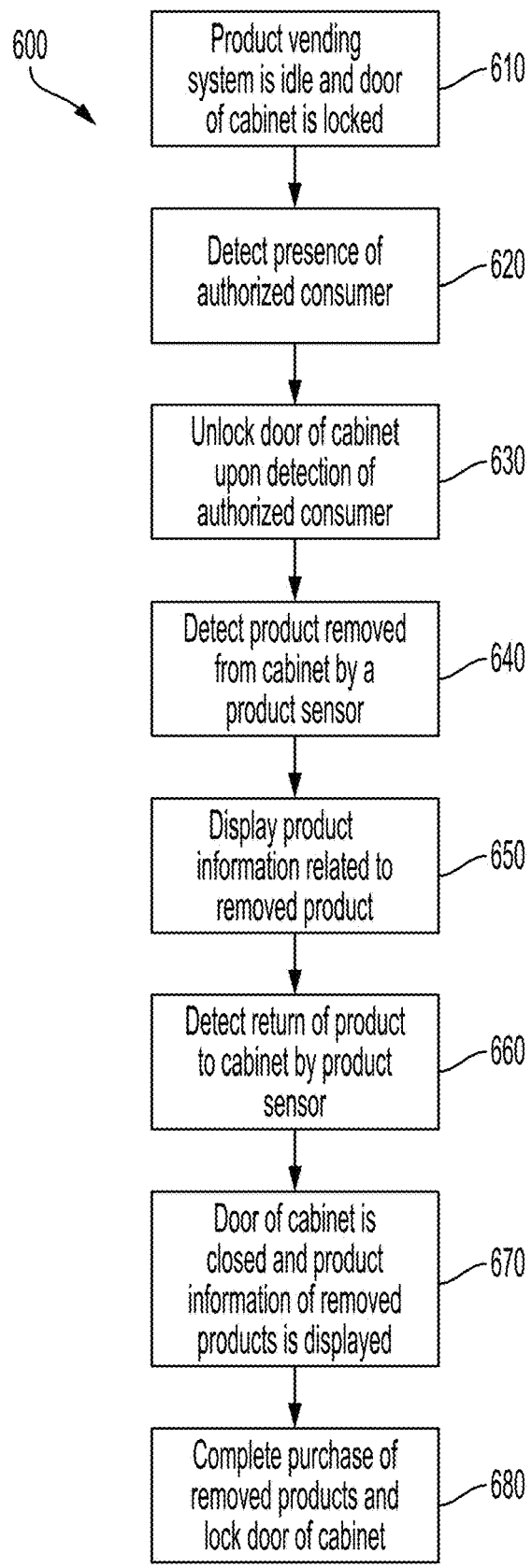
FIG. 6 shows a flow chart of an exemplary method of operation of a product vending system including a handle according to an embodiment.

An exemplary method of operating the product vending system 600 including a handle as described herein is shown in FIG. 6. When not in use, product vending system is in an idle state 610, with door of cabinet locked. Display of handle may display instructions for beginning a product vending operation, such as a prompt to enter a payment. A consumer may approach product vending system, and product vending system unlocks door of cabinet when the presence of an authorized user is detected 620. For example, an authorized user may be detected when a payment processing unit of the handle detects a payment source, such as when a consumer swipes a credit card in a credit card reader of the handle, taps a credit card or mobile payment for contactless payment, or enters a chip of a credit card into a chip reader of the handle. Alternatively, an authorized user may be detected by a biometric sensor of the handle, or when handle receives an indication that a remote payment has been made by a user, such as payment through a software application on a mobile device.

Once an authorized user is detected, the door of the cabinet is unlocked, and the consumer may open the door to select a product from the cabinet for purchase 630. The consumer may remove one or more products from cabinet and as the product exits cabinet, product sensors, such as one or more cameras, within cabinet detect the number of products removed and the type of products removed 640. Product information is displayed relating to the product(s) removed from the cabinet 650. Display of handle may display the product information, such as the number, type, product price, and a total price of the products removed. In embodiments having a product information display, product information display may also show the type or name of a product removed, the price of the product removed, and the total price of products removed. Product sensor of cabinet may determine whether a removed product is subsequently returned to cabinet 660. For example, a consumer may remove a product from a cabinet and view the product information display to determine the price of the product. If the price is not agreeable to the consumer, the consumer may return the product to the cabinet. Alternatively, a consumer may wish to remove two different products from the cabinet to inspect the products, such as to compare nutrition information or ingredients, and the consumer may opt to return one of the products and purchase the preferred product.

When the consumer is finished selecting products, the door of the cabinet is closed 670. Product information relating to the removed products is displayed on the display of the handle. Product information may include the brand of the product, the type or name of the product, the price of the product, and the total price of the removed products. If desired, consumer may reopen the door to continue selecting products. With the door closed, purchase of the removed products may be completed 680. To confirm and complete the purchase, the payment source may be required to be detected, such as by swiping or inserting a credit card a second time. Alternatively, display may show a graphic user interface that prompts a consumer to perform a gesture on the display, such as swiping from left to right to confirm the purchase. In some embodiments, once door is closed, purchase may be automatically completed after a predetermined amount of time elapses (e.g., 10 seconds). Once consumer confirms the purchase, the payment source is charged for the total price of products removed (or an account is credited for the purchase price), and the door of the cabinet locks to secure the products within the cabinet.

As a consumer is required to enter a payment source to unlock door of cabinet, the consumer can be charged for any products removed, and products cannot be removed without payment. Further, as consumer's payment source is entered, consumer is incentivized to ensure that door of cabinet is closed and locked upon completion of the purchase to avoid further charges.

Figure 7:
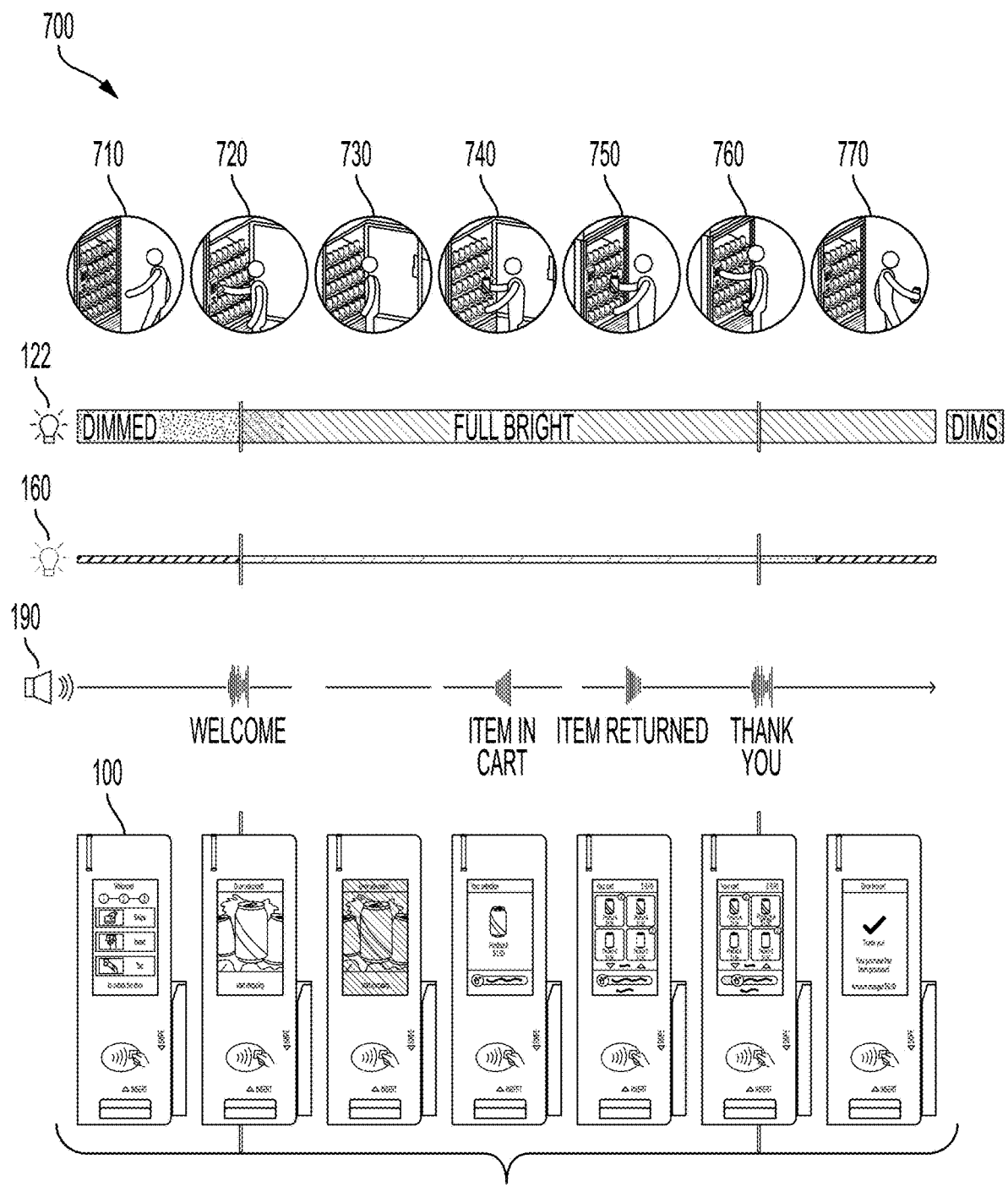
FIG. 7 shows a schematic diagram of an exemplary method of operation of a product vending system according to an embodiment.

A further exemplary method of operating a product vending system 700 including a cabinet light and an audio unit is shown in FIG. 7. When not in use, the cabinet of product vending system is locked and the cabinet light is turned-off or is dimmed 710 in order to conserve energy. An indicator light of the handle may be illuminated in a first color, such as green, to indicate to potential customers that the product vending system is available for use. A presence of an authorized consumer may be detected 720, such as when a consumer enters a payment to a payment processing unit of handle. An audio unit of handle may produce an audible alert to greet the user and to indicate that payment has been detected or received and accepted. The indicator light may then illuminate in a second color, such as blue to indicate that a vending operation is in progress.

Upon detection of the authorized user, door of cabinet unlocks and cabinet light may increase in brightness or intensity 730 to allow the consumer to more easily view products within the storage compartment. Increasing brightness of cabinet light may also allow product sensors to more easily identify products removed from or inserted into the storage compartment of the cabinet. In some embodiments, cabinet light may provide a lighting effect, such as flashing or illuminating in various colors in order to provide entertainment to the user and to indicate that the product vending operation is underway. As the display of the handle is positioned on the door, the display faces away from consumer when the door is open. When the door is open, the display may automatically turn-off or dim to prevent third parties from viewing information about the consumer's purchase and to conserve energy. The audio unit may produce an audible alert when a product is removed from the storage compartment 740. When a product is removed, audio unit may play a first tone, and when a product is returned to cabinet, audio unit may play a second tone. The second tone may be the same as or different than the first tone. In some embodiments, the second tone may be an inverse or the reverse of the first tone. For example, if the first tone is an ascending tone, the second tone may be a descending tone. A tone may play for each product removed or returned, such that if two products are removed, two tones play, and if the consumer returns only one of the two products to the cabinet, a single tone may play to indicate the return of one product to cabinet. The audible alerts may allow the consumer to easily confirm that removal of a product has been detected and that consumer will be charged for the removed product, and similarly audible alerts may allow user to confirm that the return of a removed product is recognized by the product vending system. Further, audible alerts may be beneficial for vision impaired consumers, and may add to the consumer's product purchasing experience.

When the door is closed 750, the digital display of the handle may increase in brightness or intensity and may show product information relating to the removed products, and the purchase of the removed products may be completed 760. Further, when the door is closed, the indicator light may illuminate in a third color, such as red, to provide the consumer with a warning or alert that the purchase is about to be completed. In some embodiments, purchase may be completed upon receipt or detection of a payment source at the handle, or upon receipt of a user input at the display of the handle. In some embodiments, purchase may be automatically completed after a predetermined period of time, such as ten seconds. In such embodiments, an indicator light of handle may flash or may turn red to indicate that the purchase is about to be completed or that the door of the cabinet is about to lock. Audio unit may play an alert or message to confirm completion of the purchase and to thank the customer for their purchase. Once purchase is complete 770, cabinet light may dim or turn-off to conserve energy. The indicator light of the handle may illuminate in the first color, e.g., green, to indicate that the product vending system is available for use.

In some embodiments, display 122 of handle 100 may remain in an idle state when product vending system 200 is not in use, and display 122 of handle 100 may be dimmed or turned-off to conserve energy. However, in some embodiments, display 122 of handle 100 may include a consumer attracting mode. In the consumer attracting mode, display 122 may show advertisements, such as messages, images, or videos, relating to the products and brands of products for sale in order to attract the attention of consumers in the nearby area. Product vending system 200 may include a proximity sensor 180 that detects when a consumer is within a predetermined distance of product vending system 200. When a consumer is nearby product vending system 200 as determined by proximity sensor 180, display 122 may exit consumer attracting mode and may display a welcome animation or instructions for operating product vending system 200 as discussed herein. When a consumer completes a purchase using product vending system 200, display 122 may automatically return to consumer attracting mode.

Figure 8:
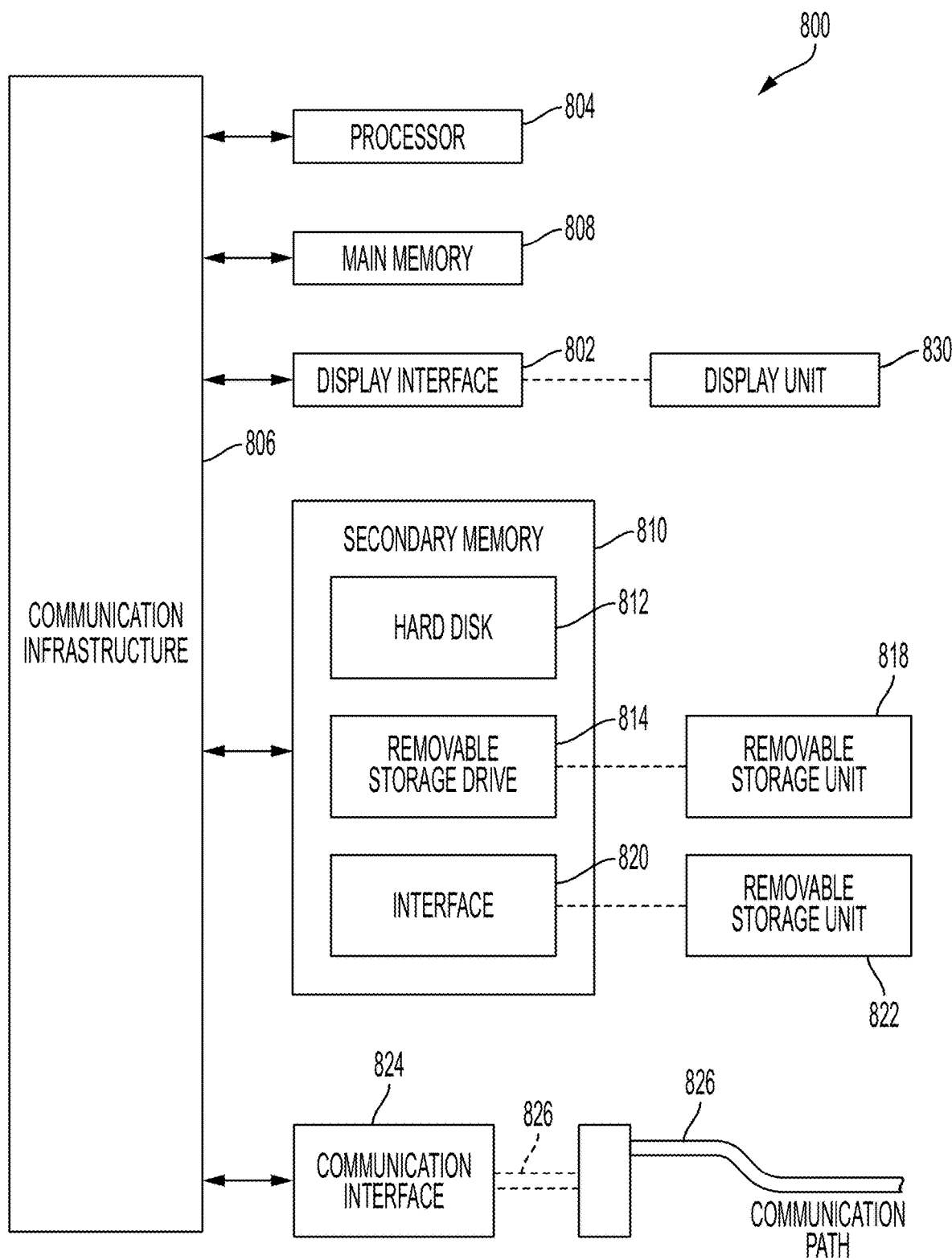
FIG. 8 shows a schematic block diagram of an exemplary computer system in which embodiments may be implemented.

FIG. 8 illustrates an exemplary computer system 800 in which embodiments, or portions thereof, may be implemented as computer-readable code. Control unit 150 as discussed herein may be computer systems having all or some of the components of computer system 800 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention(s) may be implemented in terms of this example computer system 800. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme.

Computer system 800 also includes a main memory 808, for example, random access memory (RAM), and may also include a secondary memory 810. Secondary memory 810 may include, for example, a hard disk drive 812, or removable storage drive 814. Removable storage drive 814 may include a floppy disk drive, a magnetic tape drive, an optical disk drive, a flash memory, or the like. The removable storage drive 814 reads from and/or writes to a removable storage unit 818 in a well-known manner. Removable storage unit 818 may include a floppy disk, magnetic tape, optical disk, a universal serial bus (USB) drive, etc. which is read by and written to by removable storage drive 814. As will be appreciated by persons skilled in the relevant art, removable storage unit 818 includes a computer usable storage medium having stored therein computer software and/or data.

Computer system 800 (optionally) includes a display interface 802 (which can include input and output devices such as keyboards, mice, etc.) that forwards graphics, text, and other data from communication infrastructure 806 (or from a frame buffer not shown) for display on display unit 830.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communication interface 824. Communication interface 824 allows software and data to be transferred between computer system 800 and external devices. Communication interface 824 may include a modem, a network interface (such as an Ethernet card), a communication port, a PCMCIA slot and card, or the like. Software and data transferred via communication interface 824 may be in the form of signals, which may be electronic, electromagnetic, optical, or other signals capable of being received by communication interface 824. These signals may be provided to communication interface 824 via a communication path 826. Communication path 826 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 818, removable storage unit 822, and a hard disk installed in hard disk drive 812. Computer program medium and computer usable medium may also refer to memories, such as main memory 808 and secondary memory 810, which may be memory semiconductors (e.g., DRAMs, etc.).

Computer programs (also called computer control logic) are stored in main memory 808 and/or secondary memory 810. Computer programs may also be received via communication interface 824. Such computer programs, when executed, enable computer system 800 to implement the embodiments as discussed herein. In particular, the computer programs, when executed, enable processor device 804 to implement the processes of the embodiments discussed here. Accordingly, such computer programs represent controllers of the computer system 800. Where the embodiments are implemented using software, the software may be stored in a computer program product and loaded into computer system 800 using removable storage drive 814, interface 820, and hard disk drive 812, or communication interface 824.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A handle for a product vending system, comprising:
    a housing configured to be secured to a door of a product storage cabinet having a lock;
    a user interface arranged on the housing, wherein the user interface comprises a display;
    a payment processing unit arranged on the housing, wherein the payment processing unit is configured to detect a payment source; and
    a control unit configured to communicate with the lock of the product storage cabinet, such that when the payment source is detected by the payment processing unit, the control unit is configured to unlock the lock of the product storage cabinet so as to provide access to a product stored in the product storage cabinet;
    a proximity sensor configured to detect when a user is within a predetermined distance of the product vending machine, and
    wherein the control unit is configured to communicate with a product sensor of the product storage cabinet to track removal of products from the product storage cabinet,
    wherein the control unit is configured to dim the display when the lock is unlocked,
    wherein the user interface is configured to switch from a first mode to a second mode based on the detection of the proximity sensor, and
    wherein the user interface is configured to display a virtual shopping cart comprising the identity and the price of the products removed.

2. The handle of claim 1, wherein the payment processing unit comprises one or more of a credit card reader, a near field communication antenna, and a chip reader.

3. The handle of claim 1, wherein the display is a touch-screen display configured to receive a user input.

4. The handle of claim 1, further comprising an audio unit configured to play an audible alert.

5. The handle of claim 1, wherein the housing is configured to be retrofitted onto the door of the product storage cabinet to convert the product storage cabinet into a vending machine.

6. A product vending system, comprising:
    a cabinet comprising:
        a storage compartment for storing products; and
        a door connected to the storage compartment, wherein the door is movable between a closed configuration and an open configuration when the door is unlocked;
    a handle securable to the door of the cabinet, comprising:
        a digital display configured to dim when the door is unlocked;
        a payment processing unit configured to detect a payment source;
        a control unit configured to control operation of the product vending system; and
        a proximity sensor configured to detect when a user is within a predetermined distance of the product vending machine;
    a product sensor arranged within the storage compartment that is configured to detect a product removed from the storage compartment; and
    a product information display arranged within the storage compartment, wherein the product information display is configured to display product information corresponding to a product removed from the storage compartment as detected by the product sensor,
    wherein the control unit is configured to track removal of products from the storage compartment and to cause the digital display of the handle to show a virtual shopping cart comprising product information about a product removed from the storage compartment as determined by the product sensor.

7. The system of claim 6, wherein the cabinet further comprises a lock configured to maintain the door in the closed configuration, wherein the control unit is in communication with the lock and is configured to unlock the lock when the payment source is detected by the payment processing unit.

8. The system of claim 6, further comprising a cabinet light arranged within the storage compartment, wherein the cabinet light is in communication with the control unit of the handle, and wherein the control unit is configured to increase a brightness of the cabinet light when the door of the cabinet is in the open configuration.

9. The system of claim 6, further comprising an audio unit configured to play an audible alert when a product is removed from or is returned to the storage compartment of the cabinet as determined by the product sensor.

10. The product vending system of claim 6, wherein the product sensor is an optical sensor configured to capture an image or video of the product.

11. A method for vending a product from a product storage cabinet, comprising:

receiving a payment by a control unit of a handle arranged on a door of the product storage cabinet;

unlocking a lock of the door of the product storage cabinet upon receipt of the user input to allow the door of the product storage cabinet to be opened;

detecting removal of the product from the storage compartment of the product storage cabinet by a product sensor; and displaying a virtual shopping cart comprising product information about the product removed from the product storage cabinet on a display of the handle; and dimming the display of the handle after unlocking the lock of the door of the product storage cabinet.

12. The method of claim 11, wherein receiving a user input comprises detecting a payment source by a payment processing unit of the handle.

13. The method of claim 11, further comprising playing an audible alert by an audio unit when a product is removed from the storage compartment of the product storage cabinet as determined by the product sensor.

14. The method of claim 11, further comprising increasing a brightness of a cabinet light arranged within the storage compartment after unlocking the lock of the door of the product storage cabinet.

15. The method of claim 11, wherein displaying product information comprises displaying a total price of products removed from the storage compartment.

16. The method of claim 11, further comprising receiving a user input at a user interface of the handle to complete a purchase of the product removed from the storage compartment.

17. The method of claim 11, further comprising displaying the product information on a product information display arranged within the storage compartment of the product storage cabinet.

18. The method of claim 11, further comprising locking the door of the product storage cabinet after a predetermined period of time.

19. The method of claim 11, further comprising detecting a return of the product to the storage compartment of the product storage cabinet after the product is removed from the storage compartment.

20. A product vending system, comprising:
a cabinet comprising:
a storage compartment for storing products;
a door connected to the storage compartment, the door comprising a lock; and
a product sensor configured to detect products removed from the storage compartment;
a handle secured to the door, the handle comprising:
a digital display configured to display a virtual shopping cart comprising product information about the product removed from the storage compartment;
a payment processing unit configured to detect a payment source;
a control unit, the control unit configured to:
unlock the lock when the payment source is detected;
track removal of products from the storage compartment when the product sensor detects a product is removed; and
dim the display when the lock is unlocked.

\* \* \* \* \*